(12) United States Patent
Fu et al.

(10) Patent No.: US 7,951,420 B2
(45) Date of Patent: May 31, 2011

(54) METHOD OF PREPARING PIGMENT HAVING ANGLE DEPENDENCE OF INTERFERENCE COLORS

(76) Inventors: Jiansheng Fu, Wuhan (CN); Yiting Peng, Wuhan (CN); Xiaohui Tian, Wuhan (CN)

( * ) Notice: Subject to any disclaimer, the term of this patent is extended or adjusted under 35 U.S.C. 154(b) by 0 days.

(21) Appl. No.: 12/567,741

(22) Filed: Sep. 26, 2009

(65) Prior Publication Data

US 2010/0011991 A1 Jan. 21, 2010

Related U.S. Application Data

(62) Division of application No. 10/598,362, filed as application No. PCT/CN2005/000520 on Apr. 18, 2005.

(30) Foreign Application Priority Data

Apr. 19, 2004 (CN) .......................... 2004 1 0013060

(51) Int. Cl.
*B05D 5/06* (2006.01)
*C09C 1/00* (2006.01)
*C09C 1/22* (2006.01)
*C09C 1/28* (2006.01)
*C09C 3/06* (2006.01)

(52) U.S. Cl. ........ 427/214; 106/417; 106/418; 106/436; 106/438; 106/439; 106/440; 106/441; 106/442; 106/446; 106/456; 106/457; 427/215; 427/218; 427/219

(58) Field of Classification Search .................. 106/417, 106/418, 436, 438, 439, 440, 441, 442, 446, 106/456, 457; 427/215, 218, 219, 214
See application file for complete search history.

(56) References Cited

U.S. PATENT DOCUMENTS

| | | | | |
|---|---|---|---|---|
| 6,238,471 | B1 * | 5/2001 | Vogt et al. ...................... | 106/417 |
| 6,579,355 | B1 * | 6/2003 | Schmidt et al. ................ | 106/415 |
| 6,596,070 | B1 * | 7/2003 | Schmidt et al. ................ | 106/417 |
| 6,599,355 | B1 * | 7/2003 | Schmidt et al. ................ | 106/417 |
| 6,689,205 | B1 * | 2/2004 | Bruckner et al. .............. | 106/415 |
| 6,692,561 | B1 * | 2/2004 | Schoen et al. ................. | 106/439 |
| 6,719,838 | B2 * | 4/2004 | Heider et al. .................. | 106/417 |
| 2006/0070552 | A1 * | 4/2006 | Loch et al. ..................... | 106/418 |

* cited by examiner

*Primary Examiner* — Anthony J Green
(74) *Attorney, Agent, or Firm* — Matthias Scholl, P.C.; Matthias Scholl

(57) ABSTRACT

A method of preparing a pigment exhibiting a color-shifting effect, including at least heating mica powder suspension in water, adjusting the pH value of the mixture to between 2 and 9, adding a first inorganic salt solution, maintaining the pH value of the mixture constant, stirring the mixture at constant temperature, adjusting the pH value of the mixture to between 6 and 14, adding a second inorganic salt solution, maintaining the pH value of the mixture constant, stirring the mixture at constant temperature, adjusting the pH value of the mixture to between 2 and 9, adding a third inorganic salt solution, maintaining the pH value of the mixture constant, and stirring the mixture at constant temperature.

20 Claims, No Drawings

METHOD OF PREPARING PIGMENT HAVING ANGLE DEPENDENCE OF INTERFERENCE COLORS

CROSS-REFERENCE TO RELATED APPLICATIONS

This application is a divisional of U.S. Ser. No. 10/598,362 filed on Aug. 25, 2006, now pending, which is a National Stage Application of International Patent Application No. PCT/CN2005/000520, with an international filing date of Apr. 18, 2005, which is based on Chinese Patent Application No. 200410013060.3, filed Apr. 19, 2004. The contents of all of these specifications are incorporated herein by reference.

BACKGROUND OF THE INVENTION

1. Field of the Invention

The invention relates to a method, and more particularly to a method of preparing a pigment exhibiting interference colors dependent on angles of observation.

2. Description of the Related Art

Because of their appreciation for beauty, people in different historical periods have developed various colorful pigments and dyestuffs to beautify life. Luster pigments originated from pearls and then pearl luster pigments were developed. The early pearl pigments consisted of guanine from natural fish scales. However, because of a limited amount and high price of natural pearl pigments, people have begun switching to synthetic pearl luster pigments which fall into two major forms: one is a flake-like inorganic mixture of bismuth oxychloride and calcium-sodium silicates; the other is a multilayer pearl luster pigment formed by coating metal oxides and non-metal oxides on the surface of a natural white mica and synthetic mica with methods such as evaporating and depositing, co-ion sputtering, and wet chemical methods. The reasons for why pearl luster pigments can produce pearl luster effects is that some of incident light is reflected, some is refracted, some is absorbed, and some is refracted and reflected multiple times, which causes the formation of various interference colors and a pearl or rainbow-like effect.

The multilayered pearl luster pigments on a mica base cause the reflected or refracted light to exhibit different types of luster depending on the different grain diameters of the micas; for instance, small grain diameters can produce silk-like luster, while large grain diameters can produce glittering luster.

Because of the difference in thickness of the coating metal oxides, many interference colors are generated, such as, e.g., silver-white, yellow, orange, red, purple, blue and green, all of which are monochromatic.

The crystal-like synthetic calcium-sodium silicate is not applied in many cases as the major pigment ingredient and is often used in small amounts. Because of its low weather resistance and large specific gravity, the application range of the crystal-like synthetic bismuth oxychloride is limited.

The multilayered mica-based pearl luster pigment has excellent weather and chemical resistance because of metal oxides having a high refractive index, such as titanium oxide and/or ferric oxide, coated on the mica surface. In addition, pigments with different grain diameters can be produced through size classification. Therefore, this kind of pigment is widely used in car coating, paints, coating, cosmetics, special wrapping paper, decorative paper, plastics, plastic color agglomerates, artificial leather and various printing inks, etc. However, this pigment causes monochromatic light interference only and does not produce color-shifting at various angles. It is only double-colored, if used as a dye, and thus cannot be used in certain fields and for certain applications.

At present, only such companies as Warck, BSF, and Merck in Germany, and Flex in the United States can produce pigments having color-shifting effects. An analysis of the advantages and disadvantages of their patents is made hereinbelow.

Flex in the U.S. adopts opaque tinsel or metal oxides as the base materials and coats the tinsel alternatively with metal oxides of high and low refractive indexes on one or both sides of the tinsel with vacuum-film plating. By controlling the optical thickness of the coating metal oxide layers, different color changes and color-shift zones can be obtained. The base is stripped from the net with certain meshes or dissolvable films. Therefore, precision instruments, strict technological processes, and highly pure chemical materials are needed resulting in high production cost and low productions. In addition, it is difficult to control the colors and color-shift zones, and a wide use of the pigment is limited because of its high price.

BSF in Germany adopts aluminum powders or synthetic ferric oxides (made under high temperature and pressure) as the base materials, the surface of which is coated alternatively with metal oxides of high and low refractive indexes using the VCD method. An inert gas transports boiling metal particles and deposits them on the surface of the base material at a desired coating thickness. However, there are problems with effective dispersing of the base in the cauldron and with dosing the amounts of the materials. Moreover, there is also the environmental problem of using organic metal compounds. In addition, the pigments are expensive and limited in application because of complicated preparation procedures, the necessity of precision instruments, the high cost of base making, the need for strict procedure control, and the high price of the raw materials.

Merck in Germany adopts synthetic silicon dioxide as the base material (made by plating hydrate glass with certain density on a special instrument and drying and stripping it), and hydrolyses dissolvable inorganic metal and nonmetal compounds to produce hydrate metal oxide having high and low refractive indexes which are coated alternatively on the base material. Because this is a wet chemical procedure, it is easy to operate and control the optical thickness of the desired coating. In addition, it is possible to obtain color-shifting effects by plating a layer of metal oxide having a high refractive index on the silicon dioxide base surface. However, the thickness of the base must be less than 1 micron, usually between 200 and 500 nm, which causes difficulty for the making of the base, high cost, low production, and the need for high precision instruments. Besides, the process of plating, drying, and stripping causes great wear and tear of the production machines and makes the overall procedure complicated so as to result in a high cost of base making. Consequently, the pigment is very expensive, which limits its application.

Warck in Germany adopts organic polymerized silicon liquid crystals of certain sizes, grinding them and sifting them out to pigments. As liquid crystals, the pigments have a short life span and can not be used in certain applications. In addition, the high price of liquid crystals limits their application.

U.S. Pat. No. 6,656,259 describes pigments exhibiting color-shifting effects and their synthesis. The pigments adopt flake-like silicon dioxide as the base material whose surface is coated with single-layered or multi-layered transparent or semi-transparent metal oxides.

U.S. Pat. No. 6,692,561 discloses multi-layered pigments exhibiting strong optical interference and having mica as the base material. The patent alleges that the color of the pigments changes with the viewing angle and that the pigments glitter with interfering lights. The first layer coated on the mica base is a metal oxide with a low refractive index, but the optimal value of its size and its technical specification are not stated. Therefore, it is alleged that the invention does not solve the problem that it sets out to solve. Based on a statistical analysis, the specification disclosed wavelengths at a fixed viewing angle. As a result, the range of color-shifting of the pigment is limited, and the pigment belongs to the group of ordinary pearl luster pigments, not reaching the full effect of color-shifting at different viewing angles, for such pigment should be ascertained by multiangle photometer at least five times.

SUMMARY OF THE INVENTION

In view of the above-described problems, it is one objective of the invention to provide a pigment that exhibits interference colors dependent on angles of observation.

In view of the above-described problems, it is another objective of the invention to provide a method of preparing a pigment that exhibits interference colors dependent on angles of observation.

To achieve the above objectives, in accordance with one embodiment of the invention, there is provided a pigment that exhibits interference colors dependent on angles of observation comprising a base material, a first layer, a second layer, a third layer, and optionally an outer protective layer, the base material being a mica, the first layer and the third layer each independently comprising a metal oxide having a high refractive index, the second layer comprising a metal oxide having a low refractive index, the base material being coated with the first layer, the second layer, the third layer, and optionally the outer protective layer, the first layer being in direct contact with the base material, the second layer being in direct contact with the first layer and the third layer, and the protective layer being in direct contact with the third layer.

In a class of this embodiment, a thickness of the first layer is between the optical thickness of the silver-white interference color and the optical thickness of the golden-yellow interference color.

In a class of this embodiment, a thickness of the second layer is greater than the optical thickness of the $2^{nd}$-order interference color.

In a class of this embodiment, a thickness of the second layer is between the optical thickness of $2^{nd}$-order green interference color and the optical thickness of the $4^{th}$-order interference color.

In a class of this embodiment, the metal oxide having a low refractive index is $SiO_2$.

In a class of this embodiment, the metal oxide having a high refractive index is selected from $TiO_2$, $SnO_2$, $Fe_2O_3$, $Fe_3O_4$, $CoO$, $Co_2O_3$, $ZrO_2$, $Cr_2O_3$, and mixtures and derivatives thereof.

In accordance with another embodiment of the invention, a method of preparing the pigment comprises: (i) heating mica powder suspension in water; (ii) adjusting the pH value of the mixture to between 2 and 9 by adding a diluted aqueous hydrochloric acid solution or a diluted aqueous sodium hydroxide solution; (iii) adding a first inorganic salt solution; (iv) maintaining the pH value of the mixture constant by adding a diluted aqueous hydrochloric acid solution or a diluted aqueous sodium hydroxide solution; (v) stirring the mixture at constant temperature; (vi) adjusting the pH value of the mixture to between 6 and 14 by adding a diluted aqueous sodium hydroxide solution; (vii) adding a second inorganic salt solution; (viii) maintaining the pH value of the mixture constant by adding a diluted aqueous hydrochloric acid solution; (ix) stirring the mixture at constant temperature; (x) adjusting the pH value of the mixture to between 2 and 9 by adding a diluted aqueous hydrochloric acid solution or a diluted aqueous sodium hydroxide solution; (xi) adding a third inorganic salt solution; (xii) maintaining the pH value of the mixture constant by adding a diluted aqueous hydrochloric acid solution or a diluted aqueous sodium hydroxide solution; and (xiii) stirring the mixture at constant temperature.

In a class of this embodiment, the first inorganic salt solution comprises one or more compounds selected from the group consisting of $TiCl_4$, $TiOCl_2$, $SnCl_4$, $SnCl_2$, $FeCl_3$, $FeCl_2$, $CoCl_2$, $ZrOCl_2$, and $CrCl_3$.

In a class of this embodiment, the third inorganic salt solution comprises one or more compounds selected from the group consisting of $TiCl_4$, $TiOCl_2$, $SnCl_4$, $SnCl_2$, $FeCl_3$, $FeCl_2$, $CoCl_2$, $ZrOCl_2$, and $CrCl_3$.

In a class of this embodiment, the first inorganic salt solution and the third inorganic salt solution comprise the same salt.

In a class of this embodiment, the dissolvable inorganic metal salt solution having a low refractive index is a hydrate glass compound.

In a class of this embodiment, the second inorganic salt solution comprises sodium silicate.

In a class of this embodiment, in step (i) the temperature is maintained at 60-90° C.

In a class of this embodiment, in steps (v), (ix), and (xiii) the mixture is stirred at constant temperature for a period of about 30 minutes.

In a class of this embodiment, the method further comprises flittering, washing, drying, and optionally calcining the pigment.

In a class of this embodiment, organic or inorganic ferrous pigments or outer protection layers can be coated as additional layers.

The advantages of the invention are summarized below:

1. The pigment according to the invention adopts mica as the base material, which is easy to obtain and much cheaper than opaque tinsel, metal oxides, synthetic silicon dioxide and organic liquid crystal silicon, thus greatly reducing the price of the pigment and broadening its field of application.

2. Compared with U.S. Pat. No. 6,656,259 for a pearl luster pigment having mica as the base material, the pigment of the present invention comprises as the first layer of its mica base metal oxides having a high refractive index which allows for an easy reach of the desired thickness. At the same time, the optimal thickness, which is a key to ensure the brightness of color of the pigment, is defined as the optical thickness of silver-white to golden-yellow.

3. Compared with U.S. Pat. No. 6,656,259 for pearl luster pigment with mica as the base material, the pigment of the present invention comprises in the second layer of the mica base metal oxides having a low refractive index whose thickness is the same as or greater than the optical thickness of the $2^{nd}$-order interference color. Particularly, the optical thickness between the $2^{nd}$-order green and the $4^{th}$-order interference color is the technical key to produce various interfering colors. As experiments have proved, the thickness less than the optical thickness of the $2^{nd}$-order green cannot produce a color-shifting effect. However, this invention solves that problem.

4. The synthesis of the inventive pigment can meet the desired thickness. It is possible to coat the mica surface alternatively with metal oxides having high and low refractive indexes for one or more times. Thus it is possible to produce various color-shifting tones and zones which can be doubled or tripled or multiplied, covering all colors.

5. The pigment can be manufactured using wet chemical hydrolysis and coating. Using dissolvable inorganic metal compounds, it is easy to operate without environmental pollution. Using wet chemical hydrolysis, it is also easy to control the coating thickness. In other words, by controlling the rate of pigment evaporation and deposition, it is easy to operate and control the quality of the products. Mica (or synthetic mica) is abundant for use as the base material of the invention. In addition, mica powders are low in price, nontoxic, and are easily processed and produced at low cost, thus greatly reducing the cost of the pigments. The pigments can be widely used in paint, ink, plastics, cosmetics, pottery materials, printing inks, surface paint, in paper and glass-making, multiple paint spraying, in hydrate and solution systems, and in safety applications.

DETAILED DESCRIPTION OF THE EMBODIMENTS

A pigment having a color-shifting effect comprising alternate layers of metal oxides with high and low refractive indexes, respectively, deposited via wet chemical hydrolysis on the surface of wet grinded natural mica having the thickness of 0.1-0.9 microns and the grain diameter of 5-250 microns. Through adjusting the optical thickness of the different layers, bright-colored pigments with a color-shifting effect with various zones of color and color change can be produced.

Being layer-structured, natural mica can be repeatedly cut into thin pieces theoretically until monocrystals are obtained. However, it is very difficult and nearly impossible to actually obtain monocrystals in practice. Usually, wet grinded mica powders are 0.1-0.9 microns thick, so it is inevitable to have mica grains with a rough surface, which may be acceptable for making ordinary pearl luster pigment, but impractical for producing pigments having color-shifting effects. Therefore, it is necessary to make improvements in coating structure.

The invention teaches depositing layers of metal oxides having a high refractive index on the surface of mica powders so as to smooth its step-like surface and obtain uniform optical nature. Subsequently, it teaches directly coating hydrate $SiO_2$ to a desired thickness, and upon it coating other metal oxides with a high refractive index so as to obtain a color-shifting effect.

In some special cases, the pigments of the invention can be further processed or coated so as to meet additional requirements.

A method of preparing the pigment comprises:

1. Pour wet grinded mica powders having specific standards into deionized water and stir it into a suspension solution. Heat it to 60-90° C., preferably 75-80° C. Then adjust the pH value to a desired range with diluted aqueous hydrochloric acid solution (e.g., pH 2.2, when $TiO_2$ is coated). Add a pre-measured amount of dissolvable inorganic salt solution giving a high refractive index. Keep the pH value constant by adding sodium hydroxide solution with a specific density to deposit hydrate metal oxide having a high refractive index at a desired thickness on the surface of the mica, reaching the optical thickness of from silver-white to golden-yellow. Stir it for 30 minutes at constant temperature.

2. Adjust the pH value to 6-12, preferably 6.5-9.5, with a sodium hydroxide solution. Add a pre-measured amount of dissolvable inorganic salt solution having a low refractive index. Keep the pH value constant by adding a hydrochloric acid solution. When the thickness of the second layer metal oxide is the same as or less than the optical thickness of the $2^{nd}$-order interference color, and particularly the $2^{nd}$-order green, stir it for 30 minutes at constant temperature. Particularly, various colors can be obtained starting with the $2^{nd}$-order green, and more particularly, the range of the optical thickness is between the $2^{nd}$-order green and a $4^{th}$-order interference color. The optical thickness greater than the $4^{th}$-order interference color can also produce a color-shifting effect. However, this will increase the cost.

3. Adjust the pH value of the suspension solution to 2-5 with diluted aqueous hydrochloric acid (according to the pH value of hydrolysis of metal oxides with a high refractive index, for example, when coated with $Fe_2O_3$, pH value is 3.5). Add a pre-measured amount of inorganic metal salt solution having a high refractive index to reach the desired tones and zones of color change. Stir it for 30 minutes at constant temperature. Filter, cleanse, dry, calcine, sift out, and dry.

The calcination temperature is dependant on the coating material, usually 250-1000° C., and preferably 350-900° C. When coating pigment, it is accepted to separate, dry and calcine it after coating one layer, and then switch to another layer.

If needed, the finished pigment can be further processed or coated in order to make it resistant against heat, light, weather, or chemicals, or to make it effectively attach to or detach from certain materials.

The pigment of the invention adopts mica as its base material whose surface is alternatively coated with metal oxides having high and low refractive indexes, which can be done once or many times. Therefore, it is convenient and possible to produce various tones and zones of color-shifting which can be doubled or tripled or multiplied, covering all colors. The pigment of the invention finds applications in cosmetics, car paint, coating, printing ink, decorative material, plastics, rubber, decorative wrapping paper, glass, pottery and all fields in which pearl luster pigment is used. At a low price, it is widely used.

If inorganic or organic colored pigments such as ferrous metal oxides, e.g., needle iron ore, magnetite, hematite; chromium oxide; titanium low oxide and chromium/iron compound; colored pigments, e.g., Berlin blue, Prussia blue, vanadium bismuth, chromium hydroxide, alumina cobalt, ultramarine, Tenard's Blue, sulfured cadmium, selenium compound, chromate pigments, and black carbon pigments; or organic colored pigments, e.g., indigotin, thioindigo and their derivatives, nitric pigments, benzimidazole, anthraquinone, indanthrene dye, dihydroxy quinoline, acridine; metal sulfide; hydrous metal sulfide and magenta; are further coated on the outer side of the metal oxides or BiOCl, the color of the pigment powders will have an obvious change and produce an interesting color-shifting effect.

The pigment of the invention can be conveniently blended in any proportion with organic dyes, other inorganic pigments and other inorganic single or multiple-layered pigments such as the traditional pearl luster pigments and LCPs based on phyllosilicate, glass, $SiO_2$ or metal base as well as the traditional adhesives and fittings.

The metal oxides having a high refractive index are $TiO_2$, $SnO_2$, $Fe_2O_3$, $Fe_3O_4$, CoO, $Co_2O_3$, $ZrO_2$, or $Cr_2O_3$ or their mixture or compounds.

The metal oxides with a low refractive index are $SiO_2$, $AlCl_3$, $AlCl_3$ $Al(OH)_3$, $B_2O_3$ or their mixture or compounds The dissolvable inorganic salts which can hydrolyze into metal oxides with a high refractive index are chlorine-containing compounds, such as, $TiCl_4$, $TiOCl_2$, $SnCl_4$, $SnCl_2$, $FeCl_3$, $FeCl_2$, $CoCl_2$, $ZrOCl_2$, and $CrCl_3$, etc.

The dissolvable inorganic salts which are hydrolyzed into metal oxides having low refractive indexes are water glass, sodium silicate, $AlCl_3$, $NaAlO_2$, borax, etc.

The flake-like materials that can be used as base material in the invention are various flake-like materials, including natural and artificially made flake-like materials, such as, e.g., natural mica, synthetic mica, natural mica iron, flake-like $Fe_2O_3$, graphite scales, mica sequential silver-white or golden-yellow pearl luster pigment. The main material is mica, such as, white mica, golden mica, silk mica, black mica, with high-quality white mica.

The white mica powder adopted in the invention is calcined from natural white mica under high temperature with the addition of oxygen, and wet-grinded and processed chemically so as to obtain mica powders with desired grain diameter and thickness of the base.

The base materials of the invention can also be obtained directly by wet grinding and chemical processing without calcining under high temperature so as to obtain mica powders with desired grain diameter and thickness as the base.

The main structure of the pigment of the invention is symmetrical, such as, e.g., $Fe_2O_3/SiO_2/Fe_2O_3/mica/Fe_2O_3/SiO\,Fe_2O_3$;
$TiO_2/SiO_2/TiO_2/mica/TiO_2/SiO_2/TiO_2$;
$Cr_2O_3/TiO_2/SiO_2TiO_2/mica/TiO_2/SiO_2/TiO_2/Cr_2O_3$;
$TiO_2/SiO_2/Fe_2O_3/mica/Fe_2O_3SiO_2/TiO_2$;
$Fe_2O_3/SiO_2/TiO_2/mica/TiO_2/SiO_2/Fe_2O_3$;
$Fe_2O_3.TiO_2/SiO_2/Fe_2O_3.TiO_2/mica/Fe_2O_3.TiO_2/SiO_2/Fe_2O_3.TiO_2$;
$TiO_2/Fe_2O_3/SiO_2/Fe_2O_3/TiO_2/mica/TiO_2/Fe_2O_3/SiO_2/Fe_2O_3/TiO_2$;
$TiO_2/SnO_2/TiO_2/SiO_2/TiO_2/SnO_2/TiO_2/SiO_2/mica/TiO_2/SnO_2/TiO_2/SiO_2/TiO_2/SnO_2/TiO_2/SiO_2$;
$Fe_2O_3/SiO_2/Fe_2O_3/SiO_2/Fe_2O_3/SiO_2/Fe_2O_3/mica/Fe_2O_3/SiO_2/Fe_2O_3/SiO_2$;
$Fe_2O_3/SiO_2/Fe_2O_3$;
$TiO_2/CoO/SiO_2/CoO/TiO_2/mica/TiO_2/CoO/SiO_2/CoO/TiO_2$; or
$CoO/Fe_2O_3/SiO_2/CoO/Fe_2O_3/mica/Fe_2O_3/CoO/SiO_2/Fe_2O_3/CoO$.

The structures given above as well as other structures are within the scope of the invention.

The invention can produce multiple repeating layers based on the basic structures above. That is the mica surface is multiply coated with metal oxides having high and low refractive indexes so as to obtain the needed tones and color-shifting effect, as follows:

—$Fe_2O_3/SiO_2/Fe_2O_3/SiO_2/Fe_2O_3/SiO_2/Fe_2O_3/mica/Fe_2O_3/SiO_2/Fe_2O_3/SiO_2/Fe_2O_3/SiO_2/Fe_2O_3$—;
—$TiO_2/SiO_2/TiO_2/SiO_2/TiO_2/SiO_2/TiO_2/mica/TiO_2/SiO_2/TiO_2/SiO_2/TiO_2/SiO_2/TiO_2$—.

The structure above is included in the invention and can be coated multiple times.

Examples will now follow illustrating the production procedure of the pigment of the invention.

EXAMPLE 1

The structure of the pigment is $Fe_2O_3/SiO_2/Fe_2O_3/mica/Fe_2O_3/SiO_2/Fe_2O_3$;

Suspend 16 g white mica powders with a grain diameter of 10-60 microns in 500 mL deionized water and stir and heat it to 75° C.

Adjust the pH value of the suspension to 3.5, add 18% hydrochloric acid as well as pre-measured 300 mL of 10% $FeCl_3$ solution. At the same time keep the pH value constant by adding 15% NaOH dropwise, and at last stir it at constant temperature for 15 minutes.

Adjust the pH value of the suspension to 9.5 with 32% sodium hydroxide solution and stir it for 15 minutes.

Add 2 L of a sodium silicate solution (7 g/L $SiO_2$) dropwise, at the same time keep pH value at 9.5 by adding 15% hydrochloric acid dropwise, and at last stir it for 30 minutes.

Adjust the pH value of the suspension to 3.5 with 18% hydrochloric acid solution and stir it for 30 minutes. Add 70 mL of a sodium silicate solution (120 g/L $FeCl_3$)) dropwise, and at the same time keep pH value constant by adding 15% hydrochloric acid dropwise and at last stir it for 15 minutes.

The product is filtered, cleansed, dried, calcined at 500° C., sieved by a 100 meshes sieve, and dried. It is then blended with certain proportion of adhesives made of hydrate oxidized starch and PVA, and scraped with scraping paper having white and black bottom.

The color varies between purplish-red and yellow-green as observed at vertical-horizontal angles of viewing.

The core of the invention lies in its base material of natural mica whose surface is coated with three-layered metal oxides. The first layer is the metal oxide with high refractive index. The second tire is the metal oxide with low refractive index. The third tire is the metal oxide with high refractive index. Particularly, the thickness of the first layer is the optical thickness of silver white to golden yellow, and the thickness of the second layer is the same as or greater than the optical thickness of the $2^{nd}$-order interference color.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing a pigment exhibiting a color-shifting effect, said pigment comprising a base material, a first layer, a second layer, a third layer, and optionally an outer protective layer, said base material being a mica, said first layer and said third layer each independently comprising a metal oxide having a high refractive index, said second layer comprising a metal oxide having a low refractive index, and said base material being coated with said first layer, said second layer, said third layer, and optionally said outer protective layer, and the method comprising the steps of:
   (i) heating mica powder suspension in water; followed by,
   (ii) adjusting the pH value of the mixture to between 2 and 9 by adding a diluted aqueous hydrochloric acid solution or a diluted aqueous sodium hydroxide solution; followed by,
   (iii) adding a first inorganic salt solution; followed by,
   (iv) maintaining the pH value of the mixture constant by adding a diluted aqueous hydrochloric acid solution or a diluted aqueous sodium hydroxide solution; followed by,
   (v) stiffing the mixture at constant temperature;
   (vi) adjusting the pH value of the mixture to between 6 and 14 by adding a diluted aqueous sodium hydroxide solution and stirring the mixture for a period of time; followed by,
   (vii) adding a second inorganic salt solution; followed by,
   (viii) maintaining the pH value of the mixture constant by adding a diluted aqueous hydrochloric acid solution; followed by, (ix) stiffing the mixture at constant temperature; followed by,
(x) adjusting the pH value of the mixture to between 2 and 9 by adding a diluted aqueous hydrochloric acid solution or a diluted aqueous sodium hydroxide solution and stirring the mixture for a period of time; followed by,
(xi) adding a first inorganic salt solution; followed by,
(xii) maintaining the pH value of the mixture constant by adding a diluted aqueous hydrochloric acid solution or a diluted aqueous sodium hydroxide solution; and followed by,
(xiii) stiffing the mixture at constant temperature.

2. The method of claim 1, wherein said first inorganic salt solution comprises one or more compounds selected from the group consisting of $TiCl_4$, $TiOCl_2$, $SnCl_4$, $SnCl_2$, $FeCl_3$, $FeCl_2$, $CoCl_2$, $ZrOCl_2$, and $CrCl_3$.

3. The method of claim 1, wherein said second inorganic salt solution comprises sodium silicate.

4. The method of claim 1, wherein in step (i) the temperature is maintained at 60-90° C.

5. The method of claim 1, wherein in steps (v), (ix), and (xiii) said mixture is stirred at constant temperature for a period of about 30 minutes.

6. The method of claim 1 further comprising filtering, washing, drying it, and optionally calcining said pigment.

7. The method of claim 1, wherein the pigment has the following symmetrical structure: $Fe_2O_3/SiO_2/Fe_2O_3/mica/Fe_2O_3/SiO_2/Fe_2O_3$.

8. The method of claim 1, wherein in step (ii), the pH value is adjusted to 3.5; in step (iii), $FeCl_3$ solution is added; in step (v), the mixture is stirred for 15 minutes; in step (vi), the pH value is adjusted to 9.5 and the mixture is stirred for 15 minutes; in step (vii), sodium silicate solution is added; in step (viii), the pH value is kept at 9.5; in step (ix), the mixture is stirred for 30 minutes; in step (x), the pH value is adjusted to 3.5 and the mixture is stirred for 30 minutes; in step (xi), $FeCl_3$ solution is added; and in step (xiii), stiffing the mixture for 15 minutes.

9. A method of preparing a pigment exhibiting a color-shifting effect, said pigment consisting essentially of a base material, a first layer, a second layer, a third layer, and optionally an outer protective layer, said base material being a mica, said first layer and said third layer each independently comprising a metal oxide having a high refractive index, said second layer comprising a metal oxide having a low refractive index, and said base material being coated with said first layer, said second layer, said third layer, and optionally said outer protective layer, the method consisting essentially of the following steps in the order recited:
(i) heating mica powder suspension in water;
(ii) adjusting the pH value of the mixture to between 2 and 9 by adding a diluted aqueous hydrochloric acid solution or a diluted aqueous sodium hydroxide solution;
(iii) adding a first inorganic salt solution;
(iv) maintaining the pH value of the mixture constant by adding a diluted aqueous hydrochloric acid solution or a diluted aqueous sodium hydroxide solution;
(v) stiffing the mixture at constant temperature;
(vi) adjusting the pH value of the mixture to between 6 and 14 by adding a diluted aqueous sodium hydroxide solution and stirring the mixture for a period of time;
(vii) adding a second inorganic salt solution;
(viii) maintaining the pH value of the mixture constant by adding a diluted aqueous hydrochloric acid solution;
(ix) stirring the mixture at constant temperature;
(x) adjusting the pH value of the mixture to between 2 and 9 by adding a diluted aqueous hydrochloric acid solution or a diluted aqueous sodium hydroxide solution and stiffing the mixture for a period of time;
(xi) adding a first inorganic salt solution;
(xii) maintaining the pH value of the mixture constant by adding a diluted aqueous hydrochloric acid solution or a diluted aqueous sodium hydroxide solution; and
(xiii) stirring the mixture at constant temperature.

10. The method of claim 9, wherein said first inorganic salt solution comprises one or more compounds selected from the group consisting of $TiCl_4$, $TiOCl_2$, $SnCl_4$, $SnCl_2$, $FeCl_3$, $FeCl_2$, $CoCl_2$, $ZrOCl_2$, and $CrCl_3$.

11. The method of claim 9, wherein said second inorganic salt solution comprises sodium silicate.

12. The method of claim 9, wherein in step (i) the temperature is maintained at 60-90° C.

13. The method of claim 9, wherein in steps (v), (ix), and (xiii) said mixture is stirred at constant temperature for a period of about 30 minutes.

14. The method of claim 9, wherein the pigment has the following symmetrical structure: $Fe_2O_3/SiO_2/Fe_2O_3/mica/Fe_2O_3/SiO_2/Fe_2O_3$.

15. The method of claim 9, wherein in step (ii), the pH value is adjusted to 3.5; in step (iii), $FeCl_3$ solution is added; in step (v), the mixture is stirred for 15 minutes; in step (vi), the pH value is adjusted to 9.5 and the mixture is stirred for 15 minutes; in step (vii), sodium silicate solution is added; in step (viii), the pH value is kept at 9.5; in step (ix), the mixture is stirred for 30 minutes; in step (x), the pH value is adjusted to 3.5 and the mixture is stirred for 30 minutes; in step (xi), $FeCl_3$ solution is added; and in step (xiii), stiffing the mixture for 15 minutes.

16. A method of preparing a pigment, exhibiting a color-shifting effect, said pigment consisting essentially of a base material, a first layer, a second layer, a third layer, and optionally an outer protective layer, said base material being mica, said first layer and said third layer each independently consisting essentially of a metal oxide having a high refractive index, said second layer consisting essentially of a metal oxide having a low refractive index, and said base material being coated with said first layer, said second layer, said third layer, and optionally said outer protective layer, the method consisting essentially of the following steps in the following order:
(i) heating white mica powder suspension in water at about 75° C.;
(ii) adjusting the pH value of the mixture to about 3.5 by adding a diluted aqueous hydrochloric acid solution;
(iii) adding an $FeCl_3$ solution;
(iv) maintaining the pH value of the mixture constant by adding a diluted aqueous sodium hydroxide solution;
(v) stirring the mixture at a constant temperature;
(vi) adjusting the pH value of the mixture to about 9.5 by adding a diluted aqueous sodium hydroxide solution and stiffing the mixture;
(vii) adding an $SiO_2$ solution;
(viii) maintaining the pH value of the mixture constant at 9.5 by adding a diluted aqueous hydrochloric acid solution;
(ix) stiffing the mixture at constant temperature;
(x) adjusting the pH value of the mixture to about 3.5 by adding a diluted aqueous hydrochloric acid solution and stiffing the mixture;
(xi) adding an $FeCl_3$ solution;
(xii) maintaining the pH value of the mixture constant by adding a diluted aqueous hydrochloric acid solution; and
(xiii) stirring the mixture at constant temperature.

17. The method of claim 16, wherein in step (iii) adding $FeCl_3$ in an amount sufficient to deposit said first layer having a first optical thickness that is greater than an optical thickness of silver-white interference color and smaller than an optical thickness of golden-yellow interference color.

18. The method of claim 17, wherein in step (vii) adding $SiO_2$ in an amount sufficient to deposit said second layer having a second optical thickness that is greater than an optical thickness of a $2^{nd}$-order interference color.

19. The method of claim 16, wherein the pigment has the following symmetrical structure: $Fe_2O_3/SiO_2/Fe_2O_3/mica/Fe_2O_3/SiO_2/Fe_2O_3$.

20. The method of claim 16, wherein in step (v), the mixture is stirred for 15 minutes; in step (vi), after the pH value is adjusted to 9.5 and the mixture is stirred for 15 minutes; in step (viii), the pH value is kept at 9.5; in step (ix), the mixture is stirred for 30 minutes; in step (x), the pH value is adjusted to 3.5 and the mixture is stirred for 30 minutes; and in step (xiii), stirring the mixture for 15 minutes.

* * * * *